(12) United States Patent
Harms et al.

(10) Patent No.: US 8,696,906 B2
(45) Date of Patent: Apr. 15, 2014

(54) INVOLUTE CARTRIDGE FILTER SYSTEM

(75) Inventors: Harold H. Harms, Palm Beach Gardens, FL (US); Eric D. Seville, Hobe Sound, FL (US)

(73) Assignee: Harmsco, Inc., North Palm Beach, FL (US)

( * ) Notice: Subject to any disclaimer, the term of this patent is extended or adjusted under 35 U.S.C. 154(b) by 186 days.

(21) Appl. No.: 13/114,739

(22) Filed: May 24, 2011

(65) Prior Publication Data
US 2012/0000843 A1    Jan. 5, 2012

Related U.S. Application Data

(60) Provisional application No. 61/347,684, filed on May 24, 2010.

(51) Int. Cl.
*B01D 29/52* (2006.01)
*B01D 29/50* (2006.01)
*B01D 35/22* (2006.01)
*C02F 1/00* (2006.01)
*E04H 4/16* (2006.01)

(52) U.S. Cl.
USPC ............... 210/323.1; 210/167.1; 210/323.2; 210/340; 210/345; 210/456; 210/487

(58) Field of Classification Search
USPC .................................................. 210/322–347
See application file for complete search history.

(56) References Cited

U.S. PATENT DOCUMENTS

| 3,202,284 | A | * | 8/1965 | Wade ........................... 210/787 |
| 3,720,322 | A | | 3/1973 | Harms |
| 4,187,179 | A | | 2/1980 | Harms |
| 4,561,979 | A | | 12/1985 | Harms |
| 5,174,896 | A | | 12/1992 | Harms, II |
| 5,196,119 | A | | 3/1993 | Harms et al. |
| 5,316,677 | A | | 5/1994 | Harms, II |

* cited by examiner

*Primary Examiner* — Benjamin Kurtz
(74) *Attorney, Agent, or Firm* — Akerman LLP; Michael K. Dixon (57) ABSTRACT

A fluid filter system including a filter housing having an inlet chamber that surrounds the inner chamber that houses the filter cartridges. The filter cartridges are positioned in an involute configuration to channel rotationally inward flow of the fluid as it loses kinetic energy and velocity. The configuration provides superior filtering of fluids flowing therethrough and provides superior filter life.

22 Claims, 6 Drawing Sheets

INVOLUTE CARTRIDGE FILTER SYSTEM

CROSS-REFERENCE TO RELATED APPLICATION

This application claims priority to U.S. Provisional Patent Application No. 61/347,684, filed May 24, 2010, the entirety of which is incorporated herein.

FIELD OF THE INVENTION

This invention is directed generally to fluid filters, and more particularly to fluid filters, having replaceable filter cartridges.

BACKGROUND

There exists numerous conventional fluid filters for removing contaminants from liquids, such as shown in U.S. Pat. Nos. 3,720,322 and 4,187,179. One particular style of fluid filter, such as those used in drinking water and swimming pool filtration systems, includes a generally cylindrical tank housing with removable cartridge filters, as shown in U.S. Pat. Nos. 4,561,979 and 5,316,677. The cartridge filters are formed from a filter media positioned between bottom and top plates. Fluids are filtered by directing the fluids into the tank, passing the fluids through the filter media, and expelling the filtered fluids through an outlet tube in the cartridge filter.

Tanks typically have one or more filter cartridges positioned therein. Often times, filter cartridges receive unequal usage and unequal amounts of kinetic energy and dirt loading. Typically, cartridges within a filter system are replaced at the same time. Replacing cartridges having unequal usage inevitably means that cartridges are replaced with unused cleaning capacity. Typically, the kinetic energy of the water flow is not equally distributed throughout the filter cartridge, and thus the filter cartridge receives unequal amounts of wear and tear. Thus, a more efficient filter system is needed.

SUMMARY OF THE INVENTION

This invention relates to a fluid filter system that is configured to filter materials from a fluid passing through a filter cartridge. The fluid filter system may be formed to filter materials from a fluid, such as, but not limited to, water. The fluid filter system may be formed from an enclosed housing having an inlet and an outlet, wherein the enclosed housing may be formed from a generally cylindrical tube with a base at one end and a lid at the opposite end. The fluid flow enters one or more filter cartridges positioned in the fluid flow between the inlet and the outlet. The fluid flow enters the housing tangentially, and the kinetic energy is disbursed into rotational flow. This flow rotates around the outer chamber of the housing and then cascades into the inner chamber. The configuration of the system equalizes the fluid flow path of resistance. The filter cartridges are arranged in an involute design where a smooth ever changing curve transfers the kinetic energy of the rotational flow of water at a continuously changing angle, at a continuously changing velocity, and continuously at an ever decreasing amount of kinetic energy. The fluids can flow through the central cartridge elements as easily as the perimeter cartridge elements.

The fluid filter system may include the enclosed housing formed from a cylindrical tube with a base at one end and a lid at the other opposite end, at least one inlet and at least one outlet and is defined by a longitudinal axis extending from the base to the lid. The inlet may be positioned nonorthogonally in the housing so that fluid entering the housing through the inlet flows in a rotational direction in the housing. A plurality of filter cartridges may be positioned in the enclosed housing such that the cartridges separate the inlet and the outlet such that fluids must flow through at least one filter cartridge when passing from the inlet to the outlet. The plurality of filter cartridges may form at least one involute curved line of filter cartridges extending radially outward from the longitudinal axis toward an inner surface of a side wall forming the enclosed housing such that at least one channel exists between adjacent portions of the at least one involute curved line of filter cartridges. The enclosed housing may include an inner wall offset from the side wall forming the enclosed housing. The inner wall may define an inner chamber and may form an inlet chamber between the enclosed housing side wall and the inner wall for receiving fluids. The inlet chamber may be concentric with the inner chamber housing the plurality of filter cartridges.

The fluid filter system may include a plurality of filter cartridges positioned to form one or more involute curved lines extending radially outward from a longitudinal axis in a spiral configuration. In one embodiment, the plurality of filter cartridges may form a single involute curved line extending radially outward from the longitudinal axis in a spiral configuration. In another embodiment, the plurality of filter cartridges may form two involute curved lines extending radially outward from the longitudinal axis in a spiral configuration such that the two involute curved lines are meshed together with at least one channel positioned between adjacent portions of the two involute curved lines. In yet another embodiment, the plurality of filter cartridges may form three involute curved lines extending radially outward from the longitudinal axis in a spiral configuration such that the three involute curved lines are meshed together with at least one channel positioned between adjacent portions of two involute curved lines of primary filter cartridges.

In another embodiment, the plurality of filter cartridges may form four involute curved lines of primary filter cartridges extending radially outward from the longitudinal axis in a spiral configuration such that the four involute curved lines of primary filter cartridges are meshed together with at least one channel positioned between adjacent portions of two involute curved lines of primary filter cartridges. The fluid filter system may include at least one cartridge positioned at and aligned with the longitudinal axis, wherein each of the four involute curved lines of primary filter cartridges may terminate near the longitudinal axis such that a portion of each of the four involute curved lines of primary filter cartridges is generally tangential to the at least one cartridge positioned at and aligned with the longitudinal axis.

In another embodiment, the fluid filter system may also include one or more involute curved lines of secondary filter cartridges extending radially outward and positioned in a channel between two of the four involute curved lines of primary filter cartridges. One or more secondary filter cartridges may be positioned in each channel between adjacent involute curved lines of primary filter cartridges. Each of the at least one involute curved line of filter cartridges may extend radially outward from a filter cartridge positioned along the longitudinal axis of the fluid filter system. At least two adjacent filter cartridges of the plurality of filter cartridges forming an involute curved line of filter cartridges may be in contact with each other in the at least one involute curved line of filter cartridges. In another embodiment, each filter cartridge of the plurality of filter cartridges may be in contact with adjacent filter cartridges in the at least one involute curved line of filter cartridges. Each of the involute curved line of filter cartridges may comprise a curved filter cartridge axis that is curved along its entire length.

The enclosed housing may include an inner wall offset from the housing that defines an inner chamber and forms ah inlet chamber between the enclosed housing and the inner wall for receiving fluids. The inlet chamber may be concentric with an inner chamber housing the plurality of filter cartridges. The fluid filter system may include an inlet into the inner chamber near an upper lid of the enclosed housing. In another embodiment, the fluid filter system may include an inlet into the inner chamber between an upper lid of the enclosed housing and the base.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

As shown in FIGS. 1-6, this invention encompasses improvements of kinetic energy distribution of the liquids being filtered. The invention is directed to a fluid filter system 10 that is configured to filter materials from a fluid passing through a filter 12. The fluid filter system 10 may be formed to filter materials from a fluid, such as, but not limited to, water. The fluid filter system 10 may be formed from an enclosed housing 14 having an inlet 16 and an outlet 18 and a plurality of filter cartridges 20 positioned in the fluid flow between the inlet 16 and the outlet 18. The filter cartridges 20 may have an involute configuration and may be a removable. The filter cartridges 20 may be generally elongated, cylindrical, pleated cartridges, extruded cartridges, melt blown cartridges, molded cartridges or other appropriate cartridges, and any combination thereof. The filter cartridges 20 may have any appropriate height. In at least one embodiment, the filter cartridges 20 may be, but are not limited to being, about one foot and about six feet in length.

Figure 1:
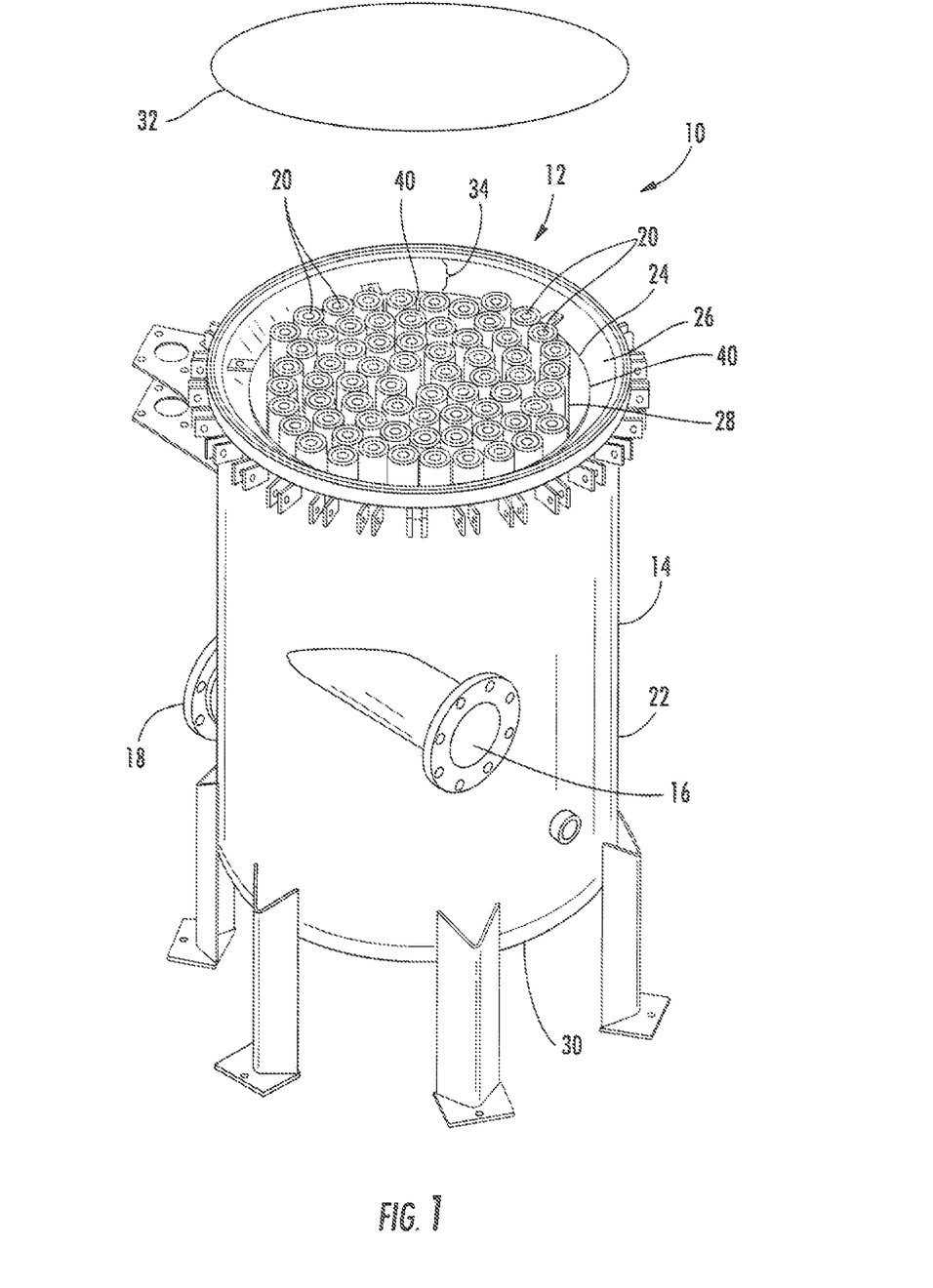
FIG. 1 is a perspective view of a filter system having aspects of this invention.

As shown in FIG. 1, the housing 14 may be formed from an outer wall 22, a base 30 and a removable lid 32. The housing 14 may also include an inner wall 24 offset from the outer wall 22 forming the housing 14 such that the inner wall 24 forms an inlet chamber 26 for receiving fluids. The inlet chamber 26 may be concentric with an inner chamber 28 housing the involute configuration of a plurality of filler cartridges 20. In other embodiments, the inner chamber 28 may be offset from the inlet chamber 26. In one embodiment, both the inlet and inner chambers 26, 28 may be generally cylindrical and, in at least one embodiment, may be formed from cylindrical tubes. In other embodiments, the inlet and inner chambers 26, 28 may have other appropriate configurations.

Figure 2:
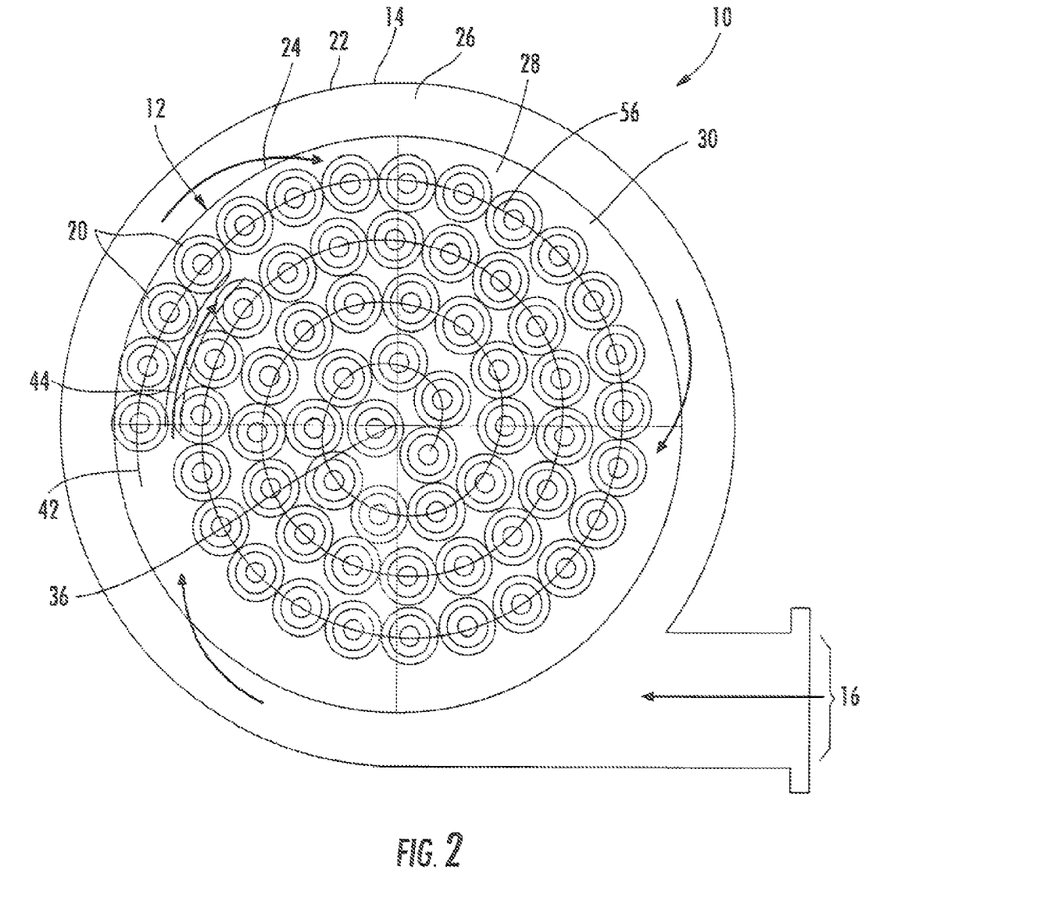
FIG. 2 is a top view of the filter system shown in FIG. 1 with the lid removed and displaying a singular involute of the filter cartridges.

The housing 14 may include an inlet 34 near the lid 32 of the enclosed housing 14 to allow fluids into the inner chamber 28. As shown in FIG. 2, the inlet 16 in the housing 14 may be positioned so that fluid entering the housing 14 through the inlet 16 flows in a rotational direction in the housing 14. In particular, the inlet 16 may be positioned nonorthogonally relative to the housing 14. In at least one embodiment, the inlet 16 may be positioned tangentially relative to the housing 14, as shown in FIG. 1. Thus, the fluid flowing in the inlet chamber 26 may flow generally rotationally about a longitudinal axis 36 extending from the base 30 of the housing 14. The inlet 34 into the inner chamber 28 from the inlet chamber 26 may be a gap between an upper edge 40 of the inner wall 24 and the removable lid 32. The fluids flowing from the inlet chamber 26 into the inner chamber 28 keep the rotational motion as the fluids flow into the inner chamber 28. In another embodiment, the inlet 34 into the inner chamber 28 may be one or more holes in the inner wall 24. The holes in the inner wall 24 may be positioned in any location between the base and the upper edge 40.

Figure 3:
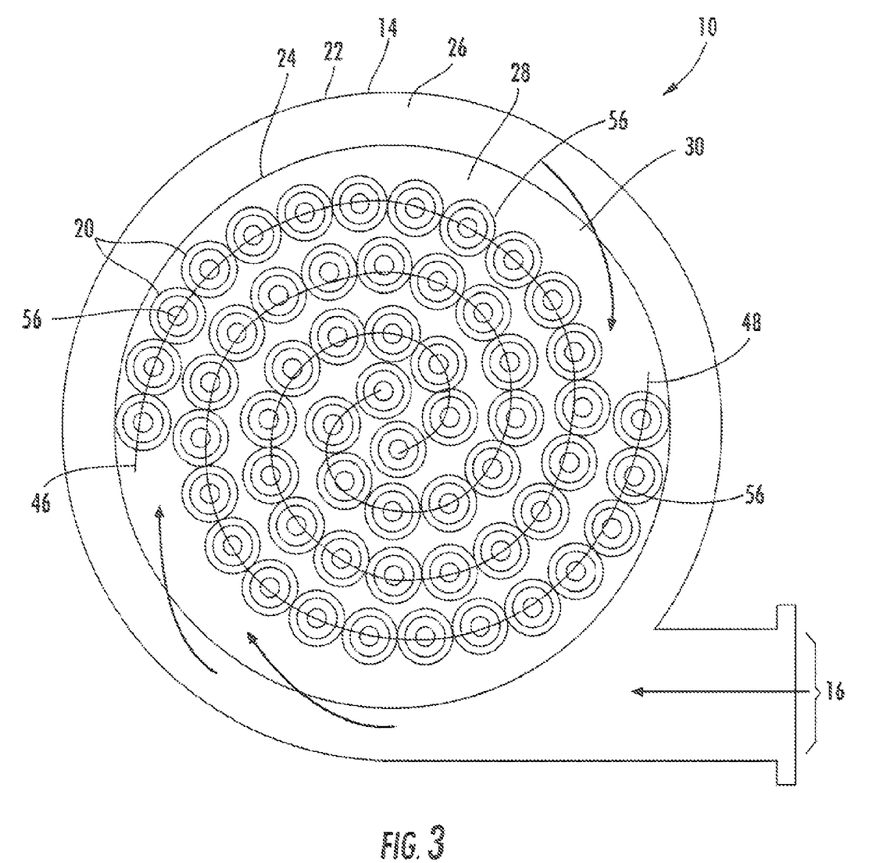
FIG. 3 is a top view of the filter system shown in FIG. 1 with the lid removed and displaying dual involutes of the filter cartridges.
Figure 4:
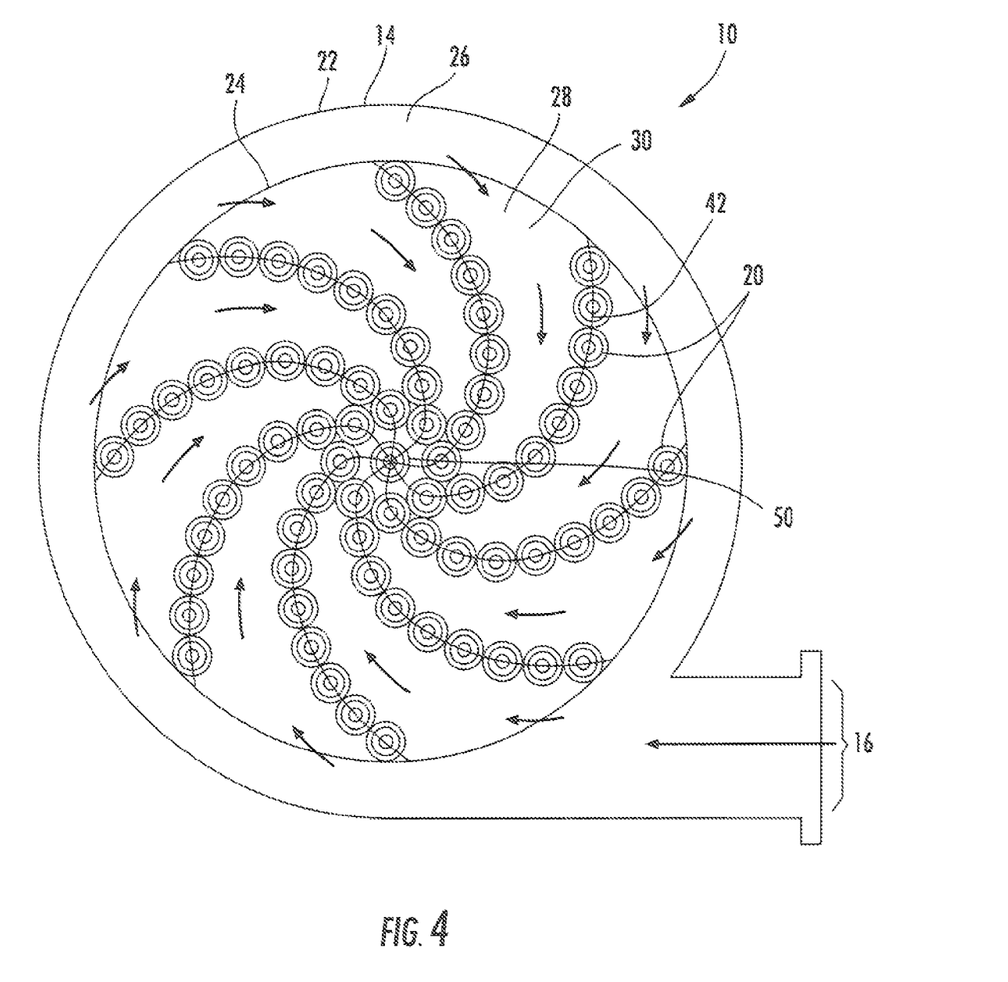
FIG. 4 is a top view of the filter system shown in FIG. 1 with the lid removed and displaying an octagonal involute configuration of the filter cartridges.

The inner chamber 28 houses a plurality of filter cartridges 20 that are configured to enable fluids to flow radially inward to the center of the housing 14 at the longitudinal axis 36. The plurality of filter cartridges 20 may be positioned in the enclosed housing 14 such that the cartridges fluidly separate the inlet 16 and the outlet 18. The plurality of filter cartridges 20 may form one or more involute curved lines 42 of filters cartridges 20 extending radially outward from the longitudinal axis 36 such that one or more channels 44 exists between adjacent portions of the one or more curved lines 42 of filters cartridges 20. The filter cartridges 20 may form a single curved line 42 extending radially outward from the longitudinal axis 36 in a spiral configuration, as shown in FIG. 2. The plurality of filter cartridges 20, as shown in FIG. 3, may form two curved lines 46, 48 extending radially outward from the longitudinal axis 36 in a spiral configuration such that the two curved lines 46, 48 are meshed together with one or more channels 44 positioned between adjacent portions of the two curved lines 46, 48. The two curved lines 46, 48 shown in FIG. 3 may start at the center of the inner chamber 28 and may terminate at opposite sides from each other. The fluid filter system 10 may include other numbers of curved lines 42, such as, but not limited to, three, four and eight curved lines of cartridge filters 20. In one embodiment, as shown in FIG. 4, each of the curved lines of cartridge filters 42 extends radially outward from a cartridge filter 50 positioned along the longitudinal axis 36 of the fluid filter system 10.

Figure 5:
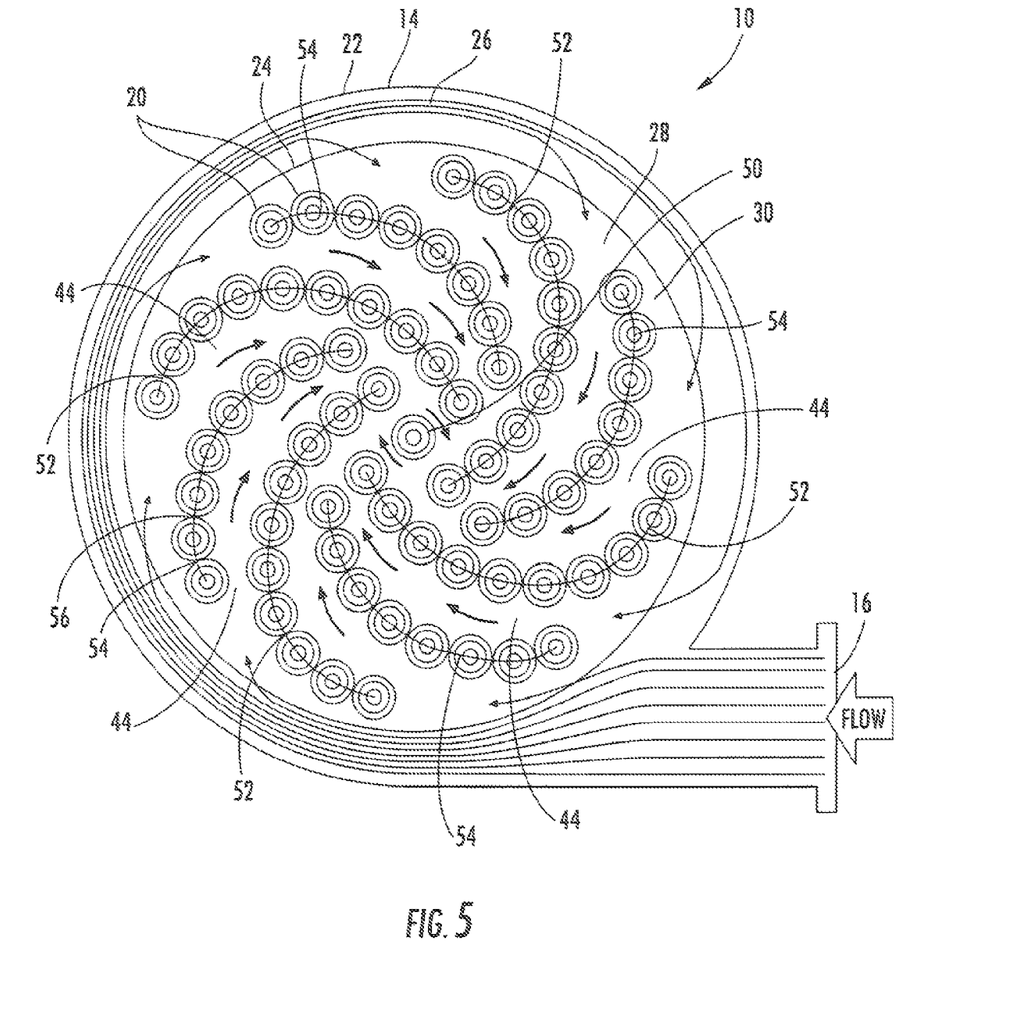
FIG. 5 is a top view of the filter system shown in FIG. 1 with the lid removed and displaying a staggered involute configuration of the filter cartridges.

As shown in FIG. 5, the plurality of filter cartridges 20 that form four curved lines of primary filter cartridges 52 may extend radially outward from the longitudinal axis 36 in a spiral configuration such that the four curved lines of primary filter cartridges 52 are meshed together with channels 44 positioned between adjacent portions of two curved lines of primary filter cartridges 52. One or more filter cartridges 50 may be positioned at and aligned with the longitudinal axis 36. Each of the four curved lines of primary filter cartridges 52 may terminate near the longitudinal axis 36 such that a portion of each of the four curved lines of primary filler cartridges 52 is generally tangential to the one or more cartridges 50 positioned at and aligned with the longitudinal axis 36. One or more curved line of secondary filter cartridges 54 may extend radially outward and be positioned in a channel 44 between two of the four curved lines of primary filter cartridges 52. A secondary filter cartridge 54 may be positioned in each channel 44 between adjacent curved lines 52 of primary filter cartridges 52.

Figure 6:
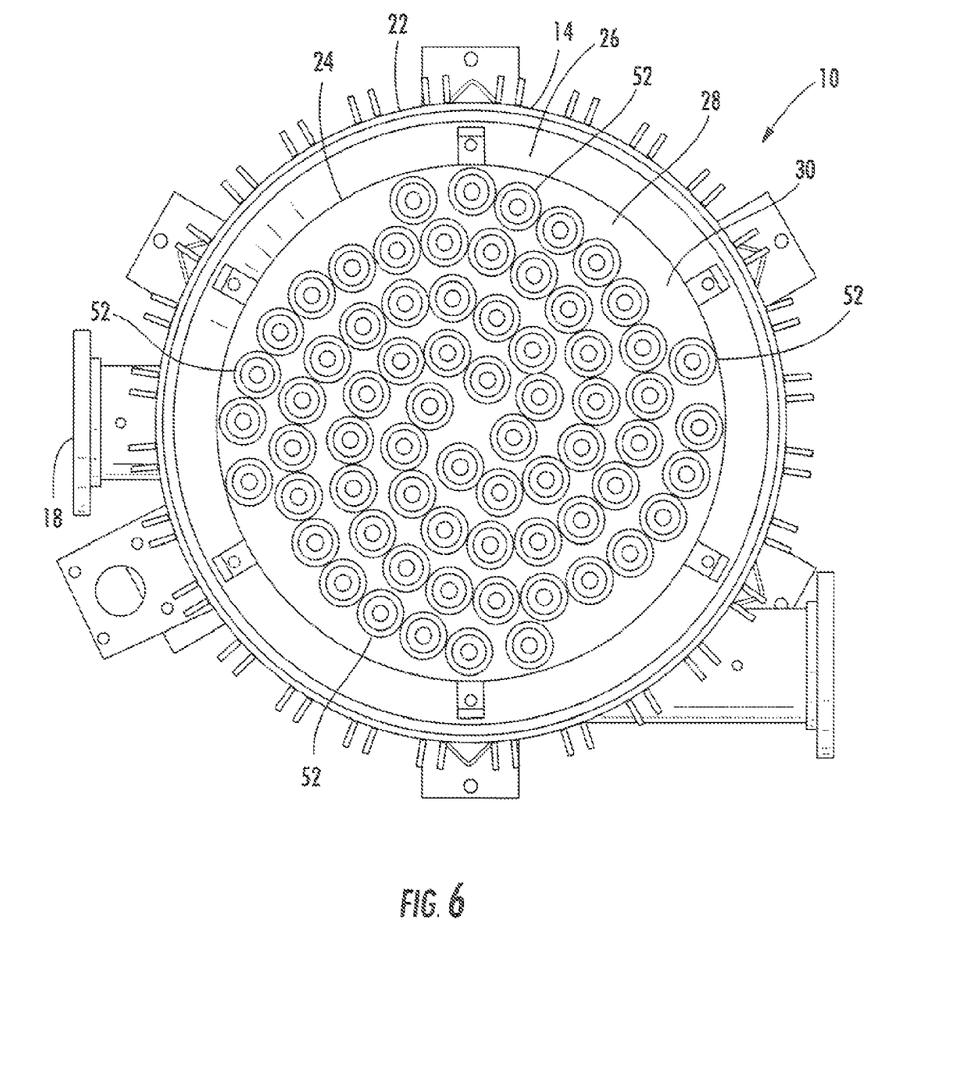
FIG. 6 is a top view of the filter system shown in FIG. 1 with the lid removed and displaying a quad involute configuration of the filter cartridges.

As shown in FIGS. 1-6, at least two adjacent filter cartridges 20 of the plurality of filter cartridges may be in contact with each other in the curved line of filter cartridges 42. In another embodiment, as shown in FIGS. 2, 3, and 6, each filter cartridge 20 of the plurality of filter cartridges 20 may be in contact with adjacent filter cartridges 20 in the curved line of filter cartridges 42. Each of the curved line of filter cartridges 42 may have a curved filter cartridge axis that is curved along its entire length.

During use, fluid enters the housing 14 through the inlet 16 and flows in a rotational direction in the housing 14. The fluid flowing in the inlet chamber 26 may flow generally rotationally about the longitudinal axis 36 extending from the base 30 of the housing 14. After the inlet chamber 26 is filled, fluid may flow through the inlet 34 into the inner chamber 28 from the inlet chamber 26. The fluids flowing from the inlet chamber 26 into the inner chamber 28 keep the rotational motion as the fluids flow into the inner chamber 28. The fluids flow into the channels 44 between the adjacent curved lines 42, 46, 48, 52 and 54 of filter cartridges 20. As a result, the usage load on the filter cartridges 20 is evenly balanced between the outermost filter cartridges 20 and the innermost filter cartridges 20. Thus, the filter cartridges 20 may be replaced at the same time without sacrificing unused portions of the filter cartridges 20.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A fluid filter system, comprising:
   an enclosed housing having at least one inlet and at least one outlet;
   wherein the at least one inlet is positioned in the housing so that fluid entering the housing through the at least one inlet flows in a rotational direction in the housing;
   wherein the enclosed housing includes a base and a longitudinal axis extending from the base;
   a plurality of filter cartridges positioned in the enclosed housing such that the cartridges separate the at least one inlet and the at least one outlet;
   wherein the plurality of filter cartridges form at least one involute curved line of filter cartridges extending radially outward from the longitudinal axis toward an inner surface of a side wall forming the enclosed housing such that at least one channel exists between adjacent portions of the at least one involute curved line of filter cartridges;
   wherein the plurality of filter cartridges form four involute curved lines of primary filter cartridges extending radially outward from the longitudinal axis in a spiral configuration such that the four involute curved lines of primary filter cartridges are meshed together with at least one channel positioned between adjacent portions of two involute curved lines of primary filter cartridges;
   at least one cartridge positioned at and aligned with the longitudinal axis, wherein each of the four involute curved lines of primary filter cartridges terminate near the longitudinal axis such that a portion of each of the four involute curved lines of primary filter cartridges is generally tangential to the at least one cartridge positioned at and aligned with the longitudinal axis.

2. The fluid filter system of claim 1, further comprising at least one involute curved line of secondary filter cartridges extending radially outward and positioned in a channel between two of the four involute curved lines of primary filter cartridges, wherein at least one secondary filter cartridge is positioned in each channel between adjacent involute curved lines of primary filter cartridges.

3. The fluid filter system of claim 1, wherein each of the involute curved line of filter cartridges comprises a curved filter cartridge axis that is curved along its entire length.

4. The fluid filter system of claim 1, wherein the enclosed housing includes an inner wall offset from the housing that defines an inner chamber and forms an inlet chamber between the enclosed housing and the inner wall for receiving fluids and, wherein the inlet chamber is concentric with an inner chamber housing the plurality of filter cartridges and includes an inlet into the inner chamber near an upper lid of the enclosed housing.

5. The fluid filter system of claim 1, wherein the enclosed housing includes an inner wall offset from the housing that defines an inner chamber and forms an inlet chamber between the enclosed housing and the inner wall for receiving fluids and, wherein the inlet chamber is concentric with an inner chamber housing the plurality of filter cartridges and includes an inlet into the inner chamber between an upper lid of the enclosed housing and the base.

6. A fluid filter system, comprising:
   an enclosed housing having at least one inlet and at least one outlet;
   wherein the at least one inlet is positioned in the housing so that fluid entering the housing through the at least one inlet flows in a rotational direction in the housing;
   wherein the enclosed housing includes a base and a longitudinal axis extending from the base;
   a plurality of filter cartridges positioned in the enclosed housing such that the cartridges separate the at least one inlet and the at least one outlet;
   wherein the plurality of filter cartridges form at least one involute curved line of filter cartridges extending radially outward from the longitudinal axis toward an inner surface of a side wall forming the enclosed housing such that at least one channel exists between adjacent portions of the at least one involute curved line of filter cartridges; and
   wherein each of the at least one involute curved line of filter cartridges extends radially outward from a filter cartridge positioned along the longitudinal axis of the fluid filter system.

7. The fluid filter system of claim 6, wherein the plurality of filter cartridges form four involute curved lines of primary filter cartridges extending radially outward from the longitudinal axis in a spiral configuration such that the four involute curved lines of primary filter cartridges are meshed together with at least one channel positioned between adjacent portions of two involute curved lines of primary filter cartridges.

8. The fluid filter system of claim 6, wherein the plurality of filter cartridges form two involute curved lines extending radially outward from the longitudinal axis in a spiral configuration such that the two involute curved lines are meshed together with at least one channel positioned between adjacent portions of the two involute curved lines.

9. A fluid filter system, comprising:
   an enclosed housing having at least one inlet and at least one outlet;
   wherein the at least one inlet is positioned in the housing so that fluid entering the housing through the at least one inlet flows in a rotational direction in the housing;
   wherein the enclosed housing includes a base and a longitudinal axis extending from the base;

a plurality of filter cartridges positioned in the enclosed housing such that the cartridges separate the at least one inlet and the at least one outlet;

wherein the plurality of filter cartridges form at least one involute curved line of filter cartridges extending radially outward from the longitudinal axis toward an inner surface of a side wall forming the enclosed housing such that at least one channel exists between adjacent portions of the at least one involute curved line of filter cartridges; and wherein at least two adjacent filter cartridges of the plurality of filter cartridges are in contact with each other in the at least one involute curved line of filter cartridges.

10. The fluid filter system of claim 9, wherein each filter cartridge of the plurality of filter cartridges is in contact with adjacent filter cartridges in the at least one involute curved line of filter cartridges.

11. The fluid filter system of claim 9, wherein the plurality of filter cartridges form four involute curved lines of primary filter cartridges extending radially outward from the longitudinal axis in a spiral configuration such that the four involute curved lines of primary filter cartridges are meshed together with at least one channel positioned between adjacent portions of two involute curved lines of primary filter cartridges.

12. The fluid filter system of claim 9, wherein the plurality of filter cartridges form two involute curved lines extending radially outward from the longitudinal axis in a spiral configuration such that the two involute curved lines are meshed together with at least one channel positioned between adjacent portions of the two involute curved lines.

13. A fluid filter system, comprising:
an enclosed housing formed from a cylindrical tube with a base at one end and a lid at the other opposite end, at least one inlet and at least one outlet and is defined by a longitudinal axis extending from the base to the lid;
wherein the inlet is positioned nonorthogonally in the housing so that fluid entering the housing through the at least one inlet flows in a rotational direction in the housing;
a plurality of filter cartridges positioned in the enclosed housing such that the cartridges separate the at least one inlet and the at least one outlet such that fluids must flow through at least one filter cartridge when passing from the at least one inlet to the at least one outlet;
wherein the plurality of filter cartridges form at least one involute curved line of filter cartridges extending radially outward from the longitudinal axis toward an inner surface of a side wall forming the enclosed housing such that at least one channel exists between adjacent portions of the at least one involute curved line of filter cartridges;
wherein the enclosed housing includes an inner wall offset from the side wall forming the enclosed housing, wherein the inner wall defines an inner chamber and forms an inlet chamber between the enclosed housing side wall and the inner wall for receiving fluids;
wherein the inlet chamber is concentric with the inner chamber housing the plurality of filter cartridges;
wherein the plurality of filter cartridges form four involute curved lines of primary filter cartridges extending radially outward from the longitudinal axis in a spiral configuration such that the four involute curved lines of primary filter cartridges are meshed together with at least one channel positioned between adjacent portions of two involute curved lines of primary filter cartridges, and at least one cartridge positioned at and aligned with the longitudinal axis, wherein each of the four involute curved lines of primary filter cartridges terminate near the longitudinal axis such that a portion of each of the four involute curved lines of primary filter cartridges is generally tangential to the at least one cartridge positioned at and aligned with the longitudinal axis.

14. The fluid filter system of claim 13, further comprising at least one involute curved line of secondary filter cartridges extending radially outward and positioned in a channel between two of the four involute curved lines of primary filter cartridges, wherein at least one secondary filter cartridge is positioned in each channel between adjacent involute curved lines of primary filter cartridges.

15. The fluid filter system of claim 13, wherein the inlet chamber includes an inlet into the inner chamber near an upper lid of the enclosed housing.

16. The fluid filter system of claim 13, wherein the inlet chamber includes an inlet into the inner chamber between an upper lid of the enclosed housing and the base.

17. A fluid filter system, comprising:
an enclosed housing formed from a cylindrical tube with a base at one end and a lid at the other opposite end, at least one inlet and at least one outlet and is defined by a longitudinal axis extending from the base to the lid;
wherein the inlet is positioned nonorthogonally in the housing so that fluid entering the housing through the at least one inlet flows in a rotational direction in the housing;
a plurality of filter cartridges positioned in the enclosed housing such that the cartridges separate the at least one inlet and the at least one outlet such that fluids must flow through at least one filter cartridge when passing from the at least one inlet to the at least one outlet;
wherein the plurality of filter cartridges form at least one involute curved line of filter cartridges extending radially outward from the longitudinal axis toward an inner surface of a side wall forming the enclosed housing such that at least one channel exists between adjacent portions of the at least one involute curved line of filter cartridges;
wherein the enclosed housing includes an inner wall offset from the side wall forming the enclosed housing, wherein the inner wall defines an inner chamber and forms an inlet chamber between the enclosed housing side wall and the inner wall for receiving fluids;
wherein the inlet chamber is concentric with the inner chamber housing the plurality of filter cartridges; and
wherein each of the at least one involute curved line of filter cartridges extends radially outward from a filter cartridge positioned along the longitudinal axis of the fluid filter system.

18. The fluid filter system of claim 17, wherein the plurality of filter cartridges form four involute curved lines of primary filter cartridges extending radially outward from the longitudinal axis in a spiral configuration such that the four involute curved lines of primary filter cartridges are meshed together with at least one channel positioned between adjacent portions of two involute curved lines of primary filter cartridges.

19. The fluid filter system of claim 17, wherein the plurality of filter cartridges form two involute curved lines extending radially outward from the longitudinal axis in a spiral configuration such that the two involute curved lines are meshed together with at least one channel positioned between adjacent portions of the two involute curved lines.

20. A fluid filter system, comprising:
an enclosed housing formed from a cylindrical tube with a base at one end and a lid at the other opposite end, at least one inlet and at least one outlet and is defined by a longitudinal axis extending from the base to the lid;

wherein the inlet is positioned nonorthogonally in the housing so that fluid entering the housing through the at least one inlet flows in a rotational direction in the housing;

a plurality of filter cartridges positioned in the enclosed housing such that the cartridges separate the at least one inlet and the at least one outlet such that fluids must flow through at least one filter cartridge when passing from the at least one inlet to the at least one outlet;

wherein the plurality of filter cartridges form at least one involute curved line of filter cartridges extending radially outward from the longitudinal axis toward an inner surface of a side wall forming the enclosed housing such that at least one channel exists between adjacent portions of the at least one involute curved line of filter cartridges;

wherein the enclosed housing includes an inner wall offset from the side wall forming the enclosed housing, wherein the inner wall defines an inner chamber and forms an inlet chamber between the enclosed housing side wall and the inner wall for receiving fluids;

wherein the inlet chamber is concentric with the inner chamber housing the plurality of filter cartridges; and wherein each filter cartridge of the plurality of filter cartridges is in contact with adjacent filter cartridges in the at least one involute curved line of filter cartridges.

21. The fluid filter system of claim 20, wherein the plurality of filter cartridges form four involute curved lines of primary filter cartridges extending radially outward from the longitudinal axis in a spiral configuration such that the four involute curved lines of primary filter cartridges are meshed together with at least one channel positioned between adjacent portions of two involute curved lines of primary filter cartridges.

22. The fluid filter system of claim 20, wherein the plurality of filter cartridges form two involute curved lines extending radially outward from the longitudinal axis in a spiral configuration such that the two involute curved lines are meshed together with at least one channel positioned between adjacent portions of the two involute curved lines.

* * * * *